United States Patent [19]
Kalkunte et al.

[11] Patent Number: 6,118,787
[45] Date of Patent: Sep. 12, 2000

[54] APPARATUS AND METHOD FOR REGULATING ASSIGNED BANDWIDTH IN HIGH SPEED PACKET SWITCHED NETWORKS

[75] Inventors: Mohan V. Kalkunte, Sunnyvale; Jayant Kadambi, Milpitas, both of Calif.

[73] Assignee: Advanced Micro Devices, Inc., Sunnyvale, Calif.

[21] Appl. No.: 08/884,222

[22] Filed: Jun. 27, 1997

[51] Int. Cl.$^7$ .................................................. H04L 12/413
[52] U.S. Cl. .......................... 370/445; 370/447; 370/448; 370/85.2; 370/85.6; 340/825.5
[58] Field of Search ................................. 370/910, 445, 370/447, 448, 446, 470, 508, 452, 413; 340/825.5

[56] References Cited

U.S. PATENT DOCUMENTS

| | | |
|---|---|---|
| 5,319,641 | 6/1994 | Fridrich et al. . |
| 5,353,287 | 10/1994 | Kuddes et al. . |
| 5,404,353 | 4/1995 | Ben-Michael et al. . |
| 5,418,784 | 5/1995 | Ramakrishnan et al. . |
| 5,422,887 | 6/1995 | Diepstraten et al. . |
| 5,436,903 | 7/1995 | Yang et al. . |
| 5,526,355 | 6/1996 | Yang et al. . |
| 5,642,360 | 6/1997 | Trainin . |
| 5,838,688 | 11/1998 | Kadambi et al. ........................ 370/445 |
| 5,854,900 | 12/1998 | Kalkunte et al. .................. 395/200.68 |
| 5,870,398 | 2/1999 | Kotchey .................................. 370/445 |

FOREIGN PATENT DOCUMENTS

| | | |
|---|---|---|
| 0632621 A2 | 1/1995 | European Pat. Off. . |
| 2232855 | 12/1990 | United Kingdom . |
| WO92/10041 | 6/1992 | WIPO . |

OTHER PUBLICATIONS

AMD, AM79C971 PCnet™–FAST Single–Chip Full–Duplex 10/100 mbps Ethernet Controller for PCI Local Bus, Preliminary Data Sheet Publication #20550, Rev. B, May 1996.

Breyer et al., "Switched and Fast Ethernet: How It Works and How to Use It", Ziff–Davis Press, Emeryville, CA (1995), pp. 60–70.

Johnson, "Fast Ethernet: Dawn of a New Network", Prentice–Hall, Inc. (1996), pp. 158–175.

Internet Message to: stds–802–3–hssg.ieee.org, from Alakd@aol.com, subject "IPG Issues", Aug. 27, 1996.

Internet Message to: Alakd@aol.com, stds–802–3–hssg@ieee.org from mart@CS.UCR.edu, subject "IPG Issues", Aug. 27, 1996.

(List continued on next page.)

*Primary Examiner*—Michael Horabik
*Assistant Examiner*—Prenell Jones

[57] ABSTRACT

A network interface for a shared gigabit Ethernet network selectively modulates an interpacket gap interval following a burst transmission in order to establish a rotating priority arrangement with network stations on the gigabit network. A network station includes a programmable burst timer that counts a burst interval corresponding to a negotiated bandwidth. The network station having accessed the media continues to transmit data packets so long as data is available in a transmit buffer, and the burst timer has not expired. Each data packet within the burst is transmitted after waiting a minimum interpacket gap interval of 96 bit times. Following the burst transmission, the network interface waits a modified delay interval equal to the minimum interpacket gap plus a multiple number of slot times related to the number of stations on the network. The modified delay interval is decremented by a slot time each time the network station detects a burst transmission by another network station. Each network station thus transmits a burst of data packets according to a negotiated bandwidth, and minimizes the number of encountered collisions by deferring to other network stations following a burst transmission.

19 Claims, 5 Drawing Sheets

OTHER PUBLICATIONS

Comer, D.E., et al., "A Rate–Based Congestion Avoidance and Control Scheme for Packet Switched Networks," Proceedings of the International Conference on Distributed Computing Systems, Paris, May 28–Jun. 1, 1990, Conf. 10, May 28, 1990, IEEE, pp. 390–397.

Williamson, C.L. et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, NY, pp. 413–426.

Gerla, M. et al., "Congestion Control in Interconnected LANS," IEEE Network, vol. 2, No. 1, Jan. 2, 1988, New York, NY, pp. 72–76.

| Figure 1A |
| Figure 1B |

APPARATUS AND METHOD FOR REGULATING ASSIGNED BANDWIDTH IN HIGH SPEED PACKET SWITCHED NETWORKS

CROSS-REFERENCE TO RELATED APPLICATIONS

This application is related to commonly-assigned, application Ser. No. 08/622,333, issued U.S. Pat. No. 5,784,375 filed Jun. 12, 1996, entitled ROTATING PRIORITY ARRANGEMENT IN AN ETHERNET NETWORK, and commonly-assigned, copending application Ser. No. 08/706,317, filed Aug. 30, 1996, entitled ARRANGEMENT FOR REGULATING PACKET FLOW RATE IN SHARED-MEDIUM, POINT-TO-POINT AND SWITCHED NETWORKS.

BACKGROUND OF THE INVENTION

1. Technical Field

The present invention relates to a network interfacing and more particularly, to methods and systems for efficiently transmitting data packets on a high speed packet switched network, such as a gigabit Ethernet network.

2. Description of the Related Art

Local area networks use a network cable or other media to link stations on the network. Each local area network architecture uses a media access control (MAC) enabling a network interface card at each station to share access to the media.

The Ethernet protocol ISO/IEC 8802-3 (ANSI/IEEE Std. 802.3, 1993 edition) defines a half-duplex media access mechanism that permits all stations to access the network channel with equality. Traffic is not distinguished or prioritized over the medium. Each station includes an Ethernet interface card that uses carrier-sense multiple-access with collision detection (CSMA/CD) to listen for traffic on the media. A station having data to send will attempt to access the channel by waiting a predetermined time after the deassertion of a receive carrier on the media, known as the interpacket gap (IPG) interval.

A full duplex environment has been proposed for Ethernet networks, referred to as IEEE 802.3x, Full Duplex with Flow Control-Working Draft (0.3). The full duplex environment provides a two-way, point-to-point communication link between two network stations using a switched hub. Hence, two stations can simultaneously transmit and receive Ethernet data packets between each other without collision.

The IEEE 802.3z Task Force is currently defining standards for the operation of a shared (i.e., half-duplex) and full-duplex gigabit Ethernet. Two modifications have been proposed to the existing Ethernet (802.3) protocol for implementation of shared gigabit Ethernet networks, namely extending the carrier by increasing the slot time to 512 bytes (4096 bits) without increasing the minimum frame length, and providing frame bursting in which a station sends several frames separated by the extend carrier symbols in a single burst.

The proposed frame bursting for gigabit Ethernet operates by a station operating according to the conventional CSMA/CD protocol when attempting to transmit the first packet. A burst timer is started at the beginning of the transmission of the first frame. If the first packet transmission is successful, the station can send an additional frame provided the following two conditions hold: (1) the burst timer has not expired, and (2) the station has another frame to send. This step is repeated until the burst timer expires or the station has no frame to send, whichever occurs first. The carrier sense is held high by the transmitting station during the entire burst. The IEEE 802.3z Task Force is currently contemplating setting the burst timer to limit the burst duration to a maximum duration of 65536 bits.

If a collision occurs during transmission of the first frame on the gigabit Ethernet media, the station follows the normal CSMA/CD operation sequence of jam, abort, and backoff collision mediation. A new burst of frames can occur only when a station has sent the first packet successfully.

Prior efforts at rate control of a shared medium typically involved use of a central management entity. For example, a token ring network passes a token in a sequential manner to network stations. A station that acquires the token has the right to transmit on the network. Upon completion of the transmission, the token is passed on to the next station. The passing of the token, however, uses up bandwidth on the media. Bandwidth is also wasted if the token is received and then passed by a station that has no data to transmit. Hence, the token ring network limits network throughput because an individual station cannot transmit data until it receives the token, regardless of whether any other station has any data to send.

Another network arrangement specified by IEEE 802.12-1995, "Demand Priority Access Method, Physical Layer and Repeater Specification for 100Mb/s Operation," also known as the VG ANYLAN network, uses a centralized hub to arbitrate among the requests from network stations. The hub grants access to the stations in a round robin fashion. However, the VG ANYLAN network still requires control by a central hub.

Other proposals suggest the user of a central management entity to assign a slot number to each station on the network, where a station transmits only when a current slot number is equal to the station slot number. Such proposals also require a centralized management entity to manage the network.

DISCLOSURE OF THE INVENTION

There is a need for an arrangement for accessing media of a gigabit Ethernet network, where stations establish a rotating priority arrangement for transmitting a burst of data packets without the use of a centralized management entity.

There is also a need for an arrangement in a network station that transmits data packets on a high speed packet switched network according to a desired transmission rate without the necessity of external monitoring or control.

These and other needs are attained by the present invention, where the interpacket gap interval following a burst transmission of selected duration is modulated based on the number of stations to enable a rotating priority arrangement between the stations on the high speed packet switched network.

According to one aspect of the present invention, a method in a network station for transmitting data packets onto network media includes setting a burst timer to a burst interval, transmitting a first data packet onto the network media, starting the burst timer in response to the first data packet transmitting step, transmitting a second available data packet following the first data packet transmitting step after a predetermined interpacket gap interval and based on the burst timer having a value within the burst interval, waiting a delay time, including the predetermined interpacket gap interval and an integer multiple of a predetermined delay time interval, before accessing the media based on the burst timer having passed the burst interval, wherein the integer is related to a number of stations connected to the network media and the predetermined delay time interval is related to a predetermined slot time. Waiting the delay time having the integer multiple of predetermined delay time intervals after a burst interval ensures that a network station having transmitted a burst of data packets defers to other stations attempting transmission, minimizing the number of collisions on the media. Moreover, setting the integer multiple of delay time intervals based on the number of stations connected to the network media and setting the predetermined delay time interval relative to the predetermined slot time ensures that the network stations can operate according to a rotating priority arrangement, where each station has a corresponding deferral interval that is consistent with the propagation characteristics of the high speed packet switched network.

Another aspect of the present invention provides a network interface for connection with network media. The network interface includes a carrier sensor configured for sensing a carrier on the media, a first programmable timer configured for counting a programmed burst interval, a first programmable delay timer configured for counting at least one of a minimum interpacket gap interval and a programmed delay interval, a controller, and a transmitter. The controller is configured for setting the first programmable delay timer with one of the minimum interpacket gap interval and the programmed delay interval, setting the programmed delay interval to a maximum value of the minimum interpacket gap interval plus a prescribed integer multiple of slot times, where the prescribed integer is related to the number of stations on the network, and decreasing the programmed delay interval in the first programmable delay timer by a slot time in response to detection of the carrier during transmission of a burst of data packets by another network station. The transmitter is configured for outputting a burst of data packets onto the media during the programmed burst interval, and waiting the minimum interpacket gap interval during the programmed burst interval and at least the programmed delay interval after the programmed burst interval. The controller controls the programmable delay timer to provide a minimum interpacket gap interval during burst transmissions and a programmed delay interval after the burst transmission, where the programmed delay interval is set by the controller to enable other network stations to access the media following the burst transmission. Moreover, the controller enables the network interface to operate according to a rotating priority arrangement with other network stations by decreasing the programmed delay interval by a slot time in response to detection of the carrier during transmission of a burst of data packets by another network station. Hence, the controller maintains the position of the network interface relative to other network stations by changing the programmed delay interval based on transmissions by the network interface and by other network stations. Use of the first programmable timer for counting a programmed burst interval also enables the network interface to transmit a burst of data packets during a programmed burst interval according to a negotiated bandwidth, where different network stations transmit at different burst intervals based on respective assigned bandwidth allocations.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figures 1, 1A:
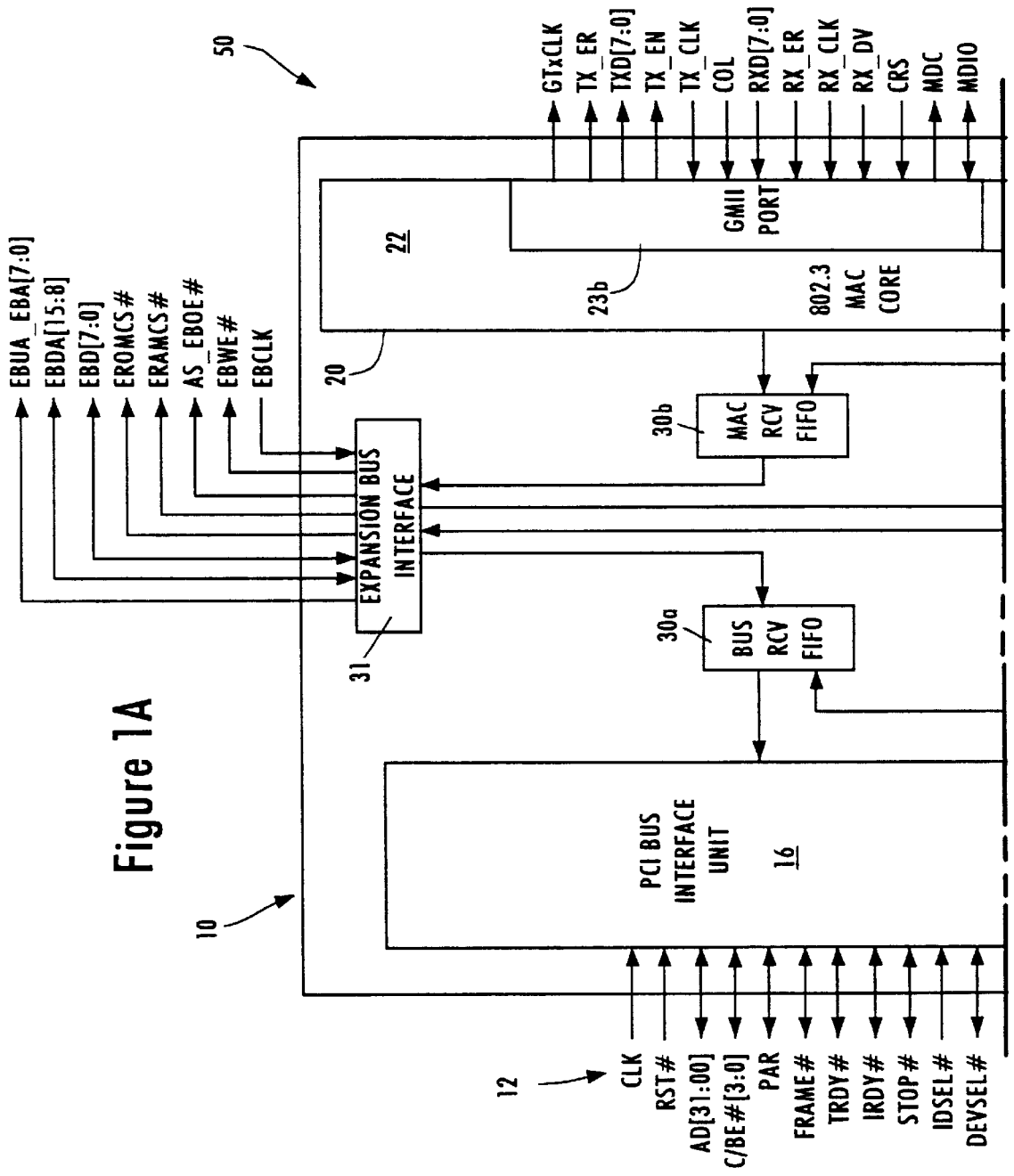
FIGS. 1, 1A and 1B are block diagrams of a network interface according to an embodiment of the present invention.
Figure 1B:
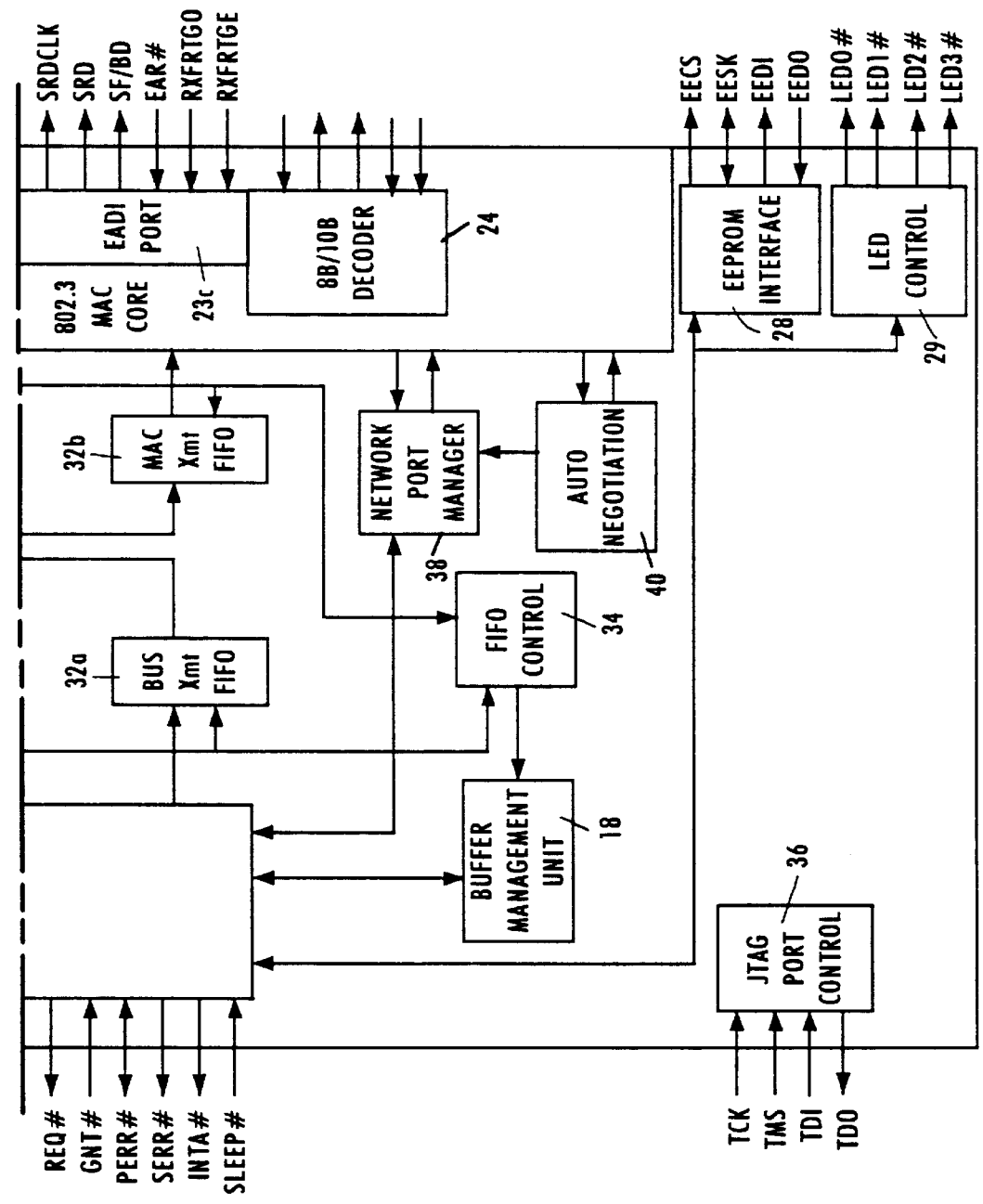

FIG. 1 is a block diagram of an exemplary network interface 10 that accesses the media of a gigabit Ethernet (ANSI/IEEE 802.3z) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based gigabit media 50. An exemplary network interface is the Am79C971 PCnet™-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif. According to the disclosed embodiment, the AM79C971 would be modified to send and receive data packets on the network media 50 at gigabit rate across a physical layer device (e.g., a gigabit serial transceiver).

The interface 10 includes a PCI bus interface unit 16, a direct memory access (DMA) buffer management unit 18, and a network interface portion 20. The network interface portion 20 includes a media access control (MAC) core 22, a Gigabit Media Independent Interface (GMII) 23b for connecting external 10Mb/s, 100Mb/s or 1000Mb/s transceivers, an External Address Detection Interface (EADI) 23c, and an 8B/10B decoder 24. The interface 10 also includes an EEPROM interface 28, an LED control 29, and an expansion bus interface 31 for boot RAM (e.g., EPROM or Flash memory) during startup, and an IEEE 1149.1-compliant JTAG Boundary Scan test access port interface 36. Full-duplex operation can be performed by the MII interface. Additional details of these interfaces are disclosed in the above-referenced Am79C971 Preliminary Data Sheet.

Although the above-described interfaces provide user flexibility, the interfaces can be reduced to the Gigabit Media Independent Interface 23b for gigabit transmissions.

The network station 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34.

The PCI bus interface unit 16, compliant with the PCI local bus specification (revision 2.1), receives data frames from a host computer via the PCI bus 12. The PCI bus interface unit 16, under the control of the DMA buffer management unit 18, receives transfers from the host computer via the PCI bus 12. The data received from the PCI bus interface unit 16 are passed to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions via the PCI bus 12. The header information identifying the byte length of the received frame is passed to the FIFO control 34.

The network interface 10 includes a network port manager 38, and an auto-negotiation unit 40. The auto-negotiation unit 40 communicates via the media 50 with a corresponding auto-negotiation unit in the hub serving the network interface 10, described below, with a corresponding auto-negotiation unit in a centralized hub, repeater, or switch that provides shared receive carrier and collision signals between different network stations.

As described in detail below, the above-described MAC 22 is configured to operate in a shared gigabit Ethernet network by providing a burst of data packets according to a burst timer, shown in FIG. 3. As described below, the disclosed MAC 22 transmits a burst of data packets according to a rotating priority arrangement, where the interburst gap (i.e., the delay interval following deassertion of a carrier sense) is modulated in each network station to establish a rotating priority arrangement between the respective network stations. When a station is allowed to transmit, the network station transmits according to a programmed burst timer length, where the programmed burst interval is generated by an external management entity based on the assigned transmission rate of the corresponding network station. Hence, the disclosed arrangement enables different network stations to transmit according to different assigned transmission rates, while at the same time minimizing the number of collisions by establishing a rotating priority arrangement, where each station selectively modulates the interburst delay time based on the number of stations on the network.

Figure 2A:
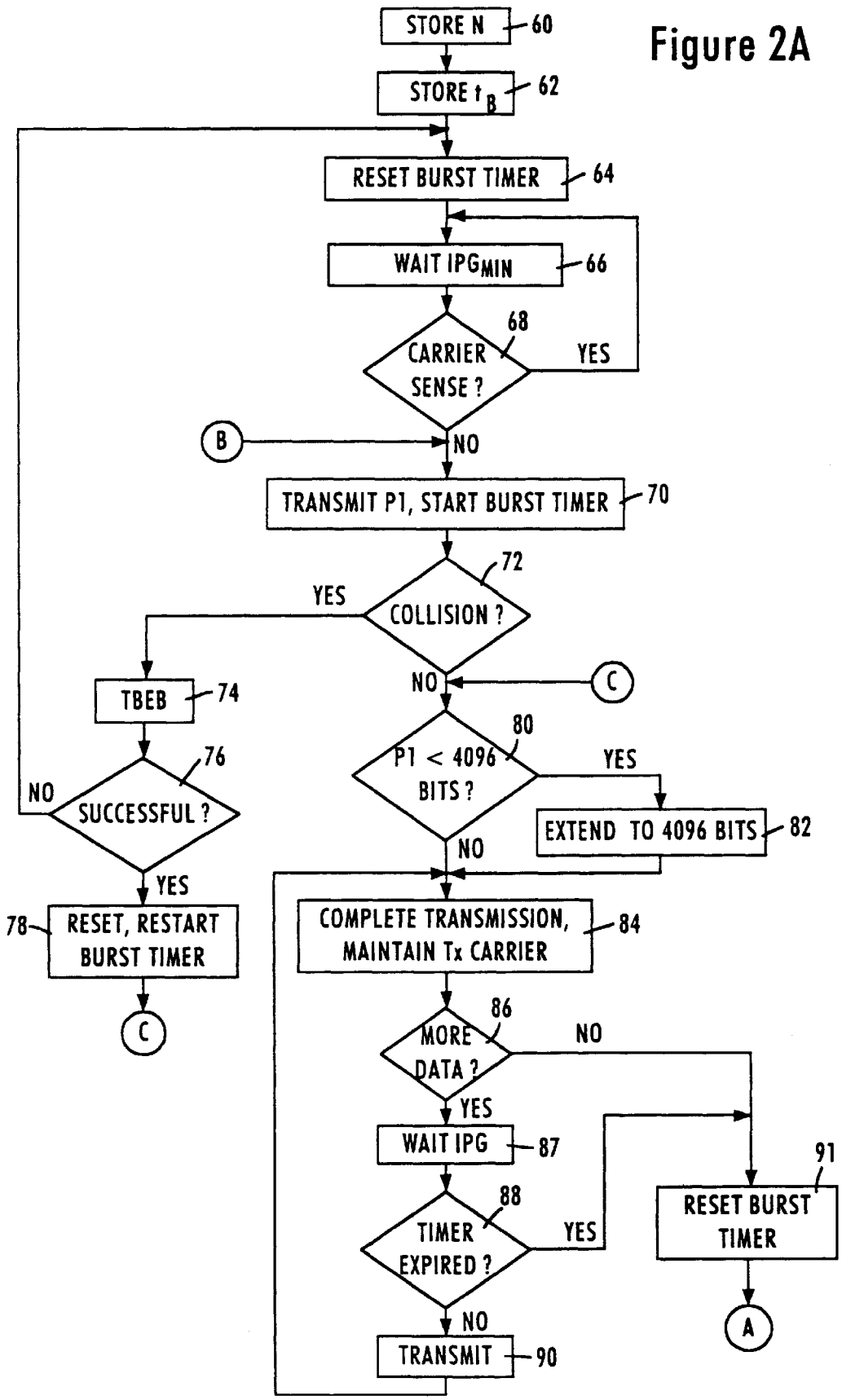
FIGS. 2A and 2B are flow diagrams summarizing a method in a network station of transmitting data packets according to an embodiment of the present invention.
Figure 2B:
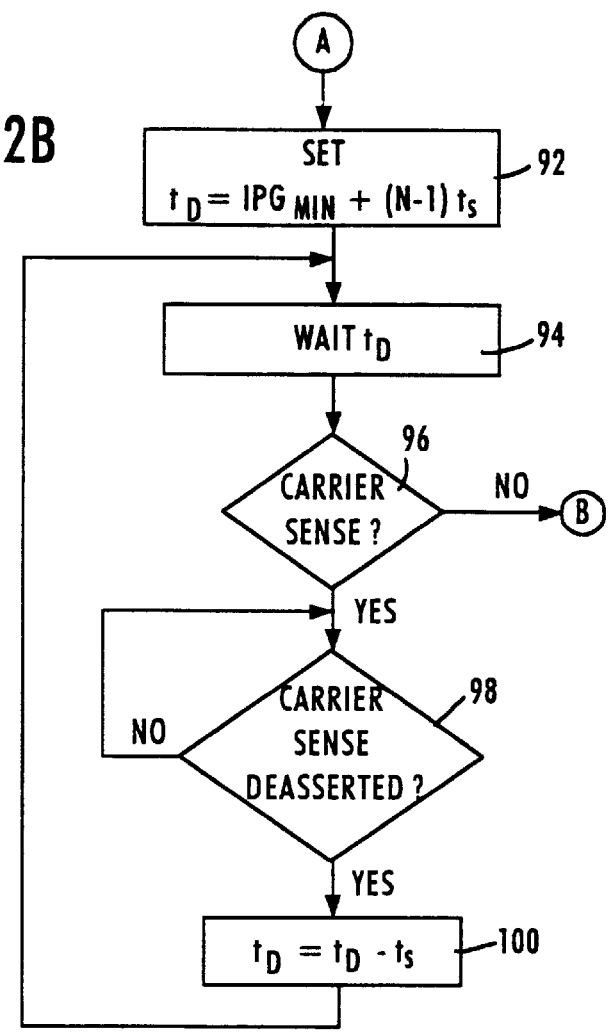

FIGS. 2A and 2B are flow diagrams summarizing the method of accessing the media according to an embodiment of the present invention. The method begins in step 60, where the MAC 22 stores in a register the number of stations (N) connected to the network media 50. The number of stations (N) may be supplied by an external management entity, for example an auto-negotiation unit within a network hub or repeater, or by a user such as a network designer. Alternatively, the number of stations (N) may be independently determined by the network station based on collisions detected on the media.

The MAC 22 then receives and stores in step 62 a burst interval ($t_B$) that specifies the maximum duration of a burst of data packets by the network station. Although the burst interval ($t_B$) may be set to a prescribed value, for example 12000 bits or 64 kilobits (as proposed by the IEEE 802.3z Task Force), a particular feature of the present invention is that the burst timer interval be configured based on a prescribed minimum burst interval ($t_{BMIN}$) and an allocated bandwidth (BW), where $t_B = t_{BMIN} \times BW$. Hence, the burst time interval can be specified by an external management entity by supplying the bandwidth multiplier (BW) to each corresponding network station.

Figure 3:
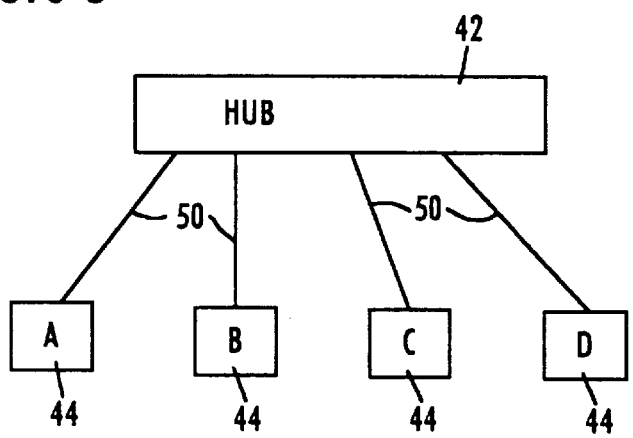
FIG. 3 is a diagram illustrating a gigabit network.

As an example of setting the burst interval based on the prescribed minimum burst interval and the assigned bandwidth allocation (BW), consider an exemplary network having four network stations, A, B, C, and D, shown in FIG. 3. The hub 42 will know the number of stations 44 on the network, and will transmit the number of stations on the network (N), and an allocated bandwidth (BW). Assuming each station 44 is required to share the bandwidth equally, the burst timer length will be equal in each corresponding station 44, for example $t_{BA} = t_{BB} = t_{BC} = t_{BD} = t_{BMIN}$. As described above, the value for $t_{BMIN}$ may be set at 12000 bits or 64 kilobits, as desired. However, the maximum value $t_B = t_{BMIN} \times BW$ should be no greater than 65536, if IEEE compliance is preferred. The minimum burst timer length must be at least 12000 bits since the maximum frame length is 1518 bytes (12144 bits). If each station 44 has the same burst timer length, then each station on average gets 25% bandwidth.

Assume now that an external management entity decides that station A needs 40% bandwidth, and that the remaining stations B, C, and D share the remaining bandwidth equally. In such a case, the ratio of burst length timers are 2:1:1:1, where stations B, C, and D get 20% of the usable bandwidth, respectively. In such a case, the hub 42 would output a bandwidth allocation multiplier of BW=2 to station A, and a multiplier of BW=1 to stations B, C, and D. Hence, different bandwidths for different stations can be maintained by having different ratios (BW) and setting the burst timer length based on the prescribed minimum burst interval and the assigned bandwidth allocation.

Referring to FIG. 2A, once the burst interval ($t_B$) is set in step 62, the MAC 22 resets the burst timer in step 64. The MAC 22 then begins transmission mode in step 66 by waiting the minimum interpacket gap interval ($IPG_{MIN}$) of 96 bit times in step 66. While waiting the minimum interpacket gap interval, the MAC 22 checks in step 68 whether a carrier is sensed in step 68 according to CSMA/CD protocol. If a carrier is sensed in step 68, the MAC 22 continues to defer to the transmission on the media. However, if in step 68 the MAC 22 does not detect a carrier sense signal (CRS) from the physical layer (not shown) during the delay interval $IPG_{MIN}$, the MAC 22 in step 70 begins to transmit a data packet (P1) and concurrently starts the burst timer after waiting the delay interval $IPG_{MIN}$. Once the MAC 22 begins transmitting the data packet (P1), the MAC 22 checks in step 72 whether a collision is encountered. If a collision is detected by the MAC 22 in step 72, the MAC 22 performs collision mediation according to the truncated binary exponential backoff (TBEB) algorithm in step 74. If the MAC 22 is successful during the collision mediation of step 74 in transmitting a data packet on the media in step 76, the MAC 22 resets and restarts the burst timer in step 78 based on the successful access of the media by the network station. However, if in step 76 the MAC 22 determines that collision mediation was unsuccessful, where another network station has gained access to the media, then the MAC 22 returns to step 64 to reset the burst timer and defer to the station currently transmitting on the media. As recognized in the art, the collision mediation of step 74 may involve repeated collisions between contending network stations before one network station successfully transmits a data packet on the medium.

Assuming the network station has gained access to the medium 50 during transmission of the first data packet (P1), the MAC 22 checks in step 80 whether the transmitted data packet (P1) is less than 4096 bits, i.e., whether the transmitted data packet is less than a single slot time. If the first transmitted data packet (P1) is less than 4096 bits, the MAC 22 outputs extension bits after the first transmitted data packet (P1) in step 82 to provide a total of 4096 bits transmitted by the MAC 22 as a single frame. The MAC 22 then completes transmission of the first data packet (P1) in step 84, and maintains the carrier on the media for example by continuing to assert the TX_EN signal by the MII port 23b. Specifically, the MAC 22 continues to assert the carrier signal if another data packet is to be transmitted as part of a burst transmission. Accordingly, the MAC 22 checks in step 86 if the transmit FIFO 32b has additional transmit data for transmission on the medium. If the transmit FIFO 32 has more transmit data to be transmitted, MAC 22 checks in step 88 whether the burst timer has expired after waiting the minimum IPG in step 87. If the burst timer has not expired, the MAC 22 starts transmission of the next data packet in step 90. Hence, the MAC 22 continues to assert the carrier signal so long a (1) the transmit FIFO 32 has another data packet to send, and (2) the burst timer has not expired.

network station transmitting a burst of data packets will continue to assert the carrier sense until completion of the burst. Upon sensing deassertion of the receive carrier, the MAC 22 decreases the programmed delay interval ($t_D$) by a slot time ($t_s$) in step 100, and waits the programmed delay interval in step 94 before attempting access of the medium.

Use of the above-described programmed delay interval ($t_D$) as the interpacket gap interval following a burst transmission establishes a rotating priority mechanism between network stations, where a station having a deferral interval $t_D = IPG_{MIN}$ gains access by having the highest priority to the media. Table 1 illustrates the sequence of slot times added to the delay interval ($t_D$) in the

TABLE 1

| STATION | SEQUENCE 1 | SEQUENCE 2 | SEQUENCE 3 | SEQUENCE 4 | SEQUENCE 5 |
|---------|------------|------------|------------|------------|------------|
| A | 0 | 3 | 2 | 1 | 0 |
| B | 1 | 0 | 3 | 2 | 1 |
| C | 2 | 1 | 0 | 3 | 2 |
| D | 3 | 2 | 1 | 0 | 3 |

As described above, the MAC 22 continues to transmit a burst of data packets so long as transmit data is available in the transmit FIFO 32, and so long as the burst timer has not expired. As described above, the burst timer may be set to a selected value based on the corresponding bandwidth assigned to the network station. The MAC 22 can thus continue to transmit a burst of data packets until the burst timer expires. Once the MAC 22 determines in step 88 that the burst timer has expired, or if the transmit FIFO 32 runs out of data, the MAC 22 terminates the burst transmission by deasserting the carrier, resetting the burst timer in step 91, and waiting an interburst delay interval as illustrated in FIG. 2B.

As shown in FIG. 2B, the MAC 22 sets the interburst delay interval ($t_D$) equal to a maximum value of the minimum interpacket gap interval ($IPG_{MIN}$) plus an integer multiple of slot times related to the number of stations on the network in step 92. Specifically, once the MAC 22 has completed a transmission of a burst of data packets according to steps 86 and 88, the MAC 22 sets the delay interval ($t_D$) to the maximum value of $t_D = IPG_{MIN} + (N-1)t_s$ in step 92, where N equals the number of stations on the network. The MAC 22 then waits the programmed interburst delay interval ($t_D$) in step 94 following deassertion of the receive data valid carrier.

Hence, the MAC 22 waits a maximum delay interval of the minimum interpacket gap plus (N-1) slot times after transmitting a burst of data packets. While waiting this extended interpacket gap interval at the end of the burst, at least one network station having data to transmit will wait the minimum IPG of 96 bit times before accessing the media. Hence, if the MAC 22 senses a carrier in step 96 asserted by another network station, the MAC 22 will defer to the transmitting network station in step 98. Assuming the network is idle and the MAC 22 does not sense a carrier while waiting the delay interval $t_D$, the MAC 22 returns to step 70 to begin transmission of another burst starting with a data packet (P1).

Hence, the MAC 22 defers to other network stations transmitting a burst of data packets in step 98. The MAC 22 will monitor the network media in step 98 to determine when the carrier sense (CRS) is deasserted. As described above, a As shown in Table 1, sequence 1 corresponds to an example where stations A, B, C, and D have delay values $t_{DA} = IPG_{MIN}$, $t_{DB} = IPG_{MIN} + t_s$, $t_{DC} = IPG_{MIN} + 2t_s$, and $t_{DD} = IPG_{MIN} + 3t_s$. Note the $IPG_{MIN}$ values are omitted for simplicity from Table 1. Assuming station A has transmitted a burst of data packets, the delay values $t_D$ are reduced in stations B, C, and D, and the delay value of station A ($t_{DA}$) is reset to obtain the delay sequence shown in sequence 2, where station B has the shortest delay time. Assuming station B has transmitted a burst of data packets in sequence 2, each station will change the corresponding delay interval $t_D$ to produce sequence 3, where station C has the minimum delay time. The same rotating priority arrangement will apply for sequences 4 and 5.

Hence, the arrangement of the present invention assures that only one station has access to the media at any given time. Moreover, the present invention provides a collision avoidance mechanism, improving the overall network throughput. Further, the present invention provides a bounded access latency, and allows for quality of service on shared Gigabit networks. Although the stations can be configured to access the network equally, the disclosed embodiment also allows the network stations to transmit bursts of data packets according to allocated bandwidths.

Although the disclosed embodiments are described with respect to shared Gigabit Ethernet networks, it will be appreciated that the present invention may also be applicable to other network protocols. In addition, the present invention may be applied to different types of data, for example, TCP/IP and IPX type of traffic.

Figure 4:
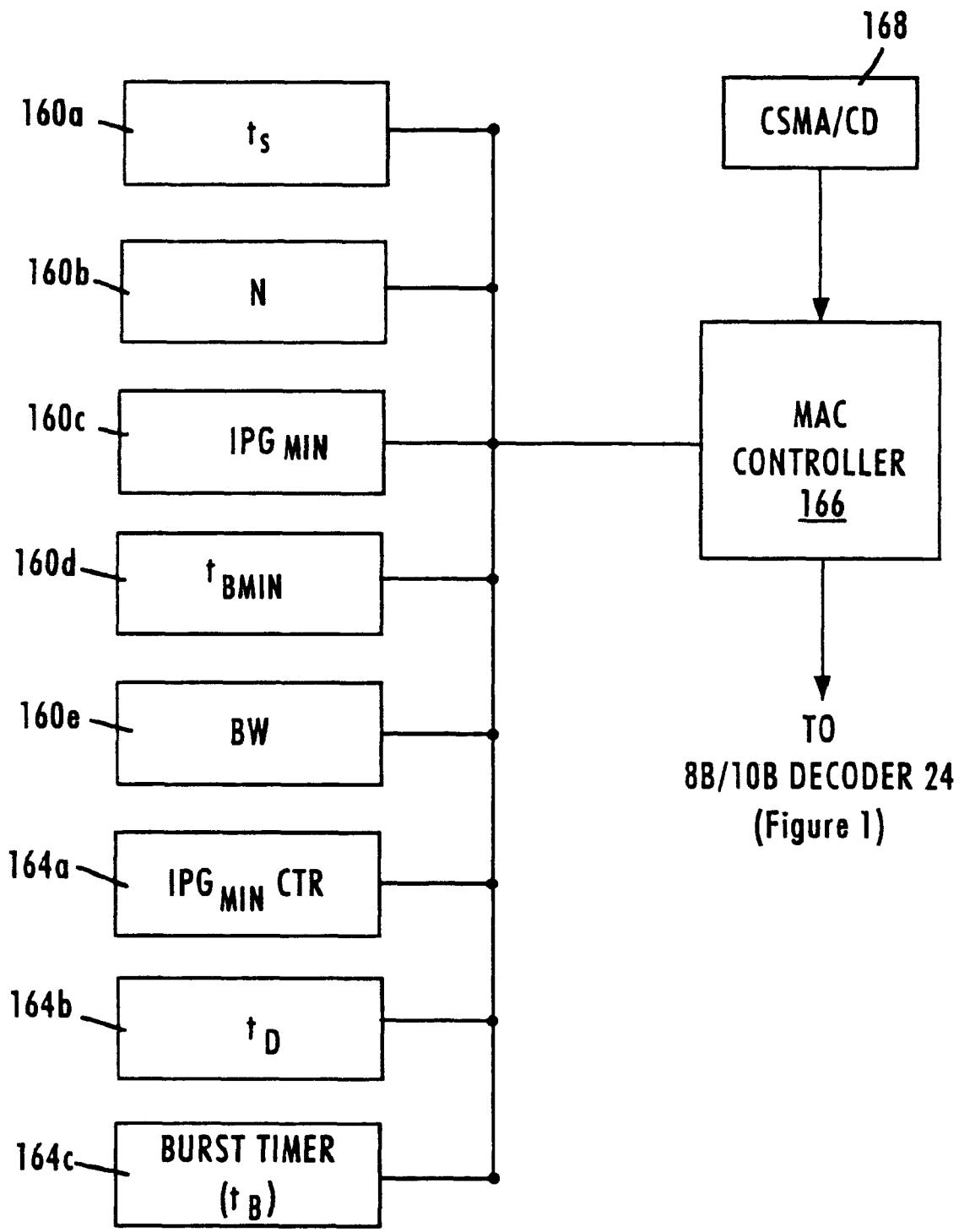
FIG. 4 is a block diagram of the media access control (MAC) of FIG. 1.

FIG. 4 is a block diagram of the MAC 22 of FIG. 1. The media access control 22 includes a plurality of registers 160 and timers 164. The MAC 22 also includes a controller 166 and a carrier sense multiple access/collision detection (CSMA/CD) portion 168. The resisters 160a, 160b, 160c, 160d, and 160e are stored with the slot time ($t_s$), number of stations (N), minimum interpacket gap interval ($IPG_{MIN}$), the minimum burst length ($t_{BMIN}$), and the allocated bandwidth (BW), respectively.

Timers 164a, 164b and 164c count the minimum IPG ($IPG_{MIN}$) for consecutive packet transmissions within a burst, the modified interpacket gap interval following a burst ($t_D$), and the programmed burst interval ($t_B$), respectively. The IPG timer 164a is a non-programmable timer that counts 96 bit times. The timer 164b is a programmable timer and may be selectively set with the minimum IPG ($IPG_{MIN}$) or the programmed delay interval ($t_D$).

The IPG counter 164a and the programmable timer 164b may be implemented as an array of registers each holding different counter values based on the value of (N). Hence, the delay values may be calculated by using the value (N) as a pointer that points to a register having the appropriate delay value.

The MAC controller 166 controls the delay timers 164, for example by setting the programmed delay timer ($t_D$) as described in FIGS. 2A and 2B, and decrementing the delay time ($t_D$) in response to signals from the CSMA/CD 168 indicating, for example, that deassertion of the receive carrier on the media has been sensed, or the presence of a carrier signal by another network station transmitting a burst of data packets. The MAC controller 166 sends an instruction to the 8B/10B decoder to attempt access to the media after the appropriate timers 164 have reached the programmed delay times specified in FIGS. 2A and 2B.

While this invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

We claim:

1. A method in a network station for transmitting data packets onto network media, comprising:

setting a burst timer to a burst interval;

transmitting a first data packet onto the network media;

starting the burst timer in response to the first data packet transmitting step;

following the first data packet transmitting step, transmitting a second available data packet after a predetermined interpacket gap interval and based on the burst timer having a value within the burst interval; and following the first data packet transmitting step, waiting a delay time, including the predetermined interpacket gap interval and an integer multiple of a predetermined delay time interval, before accessing the media based on the burst timer having passed the burst interval, the integer related to a number of stations connected to the network media, the predetermined delay time interval related to a predetermined slot time.

2. The method of claim 1, wherein the first data packet transmitting step comprises transmitting the first data packet, and transmitting pad bits after the first data packet based on the predetermined slot time.

3. The method of claim 2, wherein the second available data packet transmitting step comprises determining the presence of the second available data packet in a transmit buffer.

4. The method of claim 2, further comprising transmitting a plurality of data packets following the second available data packet transmitting step while the burst timer has the value within the burst interval, each of the data packets preceded by the predetermined interpacket gap interval.

5. The method of claim 1, wherein the setting step comprises:

storing an assigned bandwidth allocation; and setting the burst interval based on a prescribed minimum burst interval and the assigned bandwidth allocation.

6. The method of claim 5, wherein the assigned bandwidth allocation corresponds to a ratio of a number of allocated slots relative to a total number of slots.

7. The method of claim 5, wherein the prescribed minimum burst interval equals 12000 bits.

8. The method of claim 5, wherein the prescribed minimum burst interval equals 64 kilobits.

9. The method of claim 1, further comprising:

following the waiting step, sensing a presence of a carrier signal on the media;

deferring to network traffic based on sensing the sensed carrier signal;

reducing the delay time by a slot time in response to the sensed carrier signal; and waiting the reduced delay time in response to the deassertion of the sensed carrier signal.

10. The method of claim 9, further comprising:

sensing the presence of the carrier signal during the reduced delay time waiting step;

if no carrier signal was sensed during the reduced delay time waiting step, transmitting a data packet on the media; and if the carrier signal was sensed during the reduced delay time waiting step, reducing the delay time by a slot time in response to deassertion of the carrier signal sensed during the reduced delay time waiting step.

11. The method of claim 1, further comprising determining the number of stations connected to the network media.

12. The method of claim 11, further comprising setting the integer to a maximum value equal to the number of stations minus one.

13. The method of claim 1, wherein the network is a CSMA/CD Gigabit network, the predetermined interpacket gap interval equal to five hundred twelve (512) bit times and the predetermined slot time equal to four thousand ninety six (4096) bit times.

14. A network interface for connection with network media, comprising:

a carrier sensor configured for sensing a carrier on the media;

a first programmable timer configured for counting a programmed burst interval;

a first programmable delay timer configured for counting at least one of a minimum interpacket gap interval and a programmed delay interval;

a controller for setting the first programmable delay timer with one of the minimum interpacket gap interval and the programmed delay interval, the controller setting the programmed delay interval to a maximum value of the minimum interpacket gap interval plus a prescribed integer multiple of slot times, the prescribed integer related to the number of stations on the network, the controller decreasing the programmed delay interval in the first programmable delay timer by a slot time in response to detection of the carrier during transmission of a burst of data packets by another network station; and a transmitter configured for outputting a burst of data packets onto the media during the programmed burst interval, the transmitter waiting the minimum interpacket gap interval during the programmed burst interval and at least the programmed delay interval after the programmed burst interval.

15. The interface of claim 14, further comprising a second programmable delay timer configured for counting the minimum interpacket gap interval, the first programmable delay timer configured for counting the programmed delay interval.

16. The interface of claim 15, wherein the controller selectively counts an interframe spacing using the second programmable delay timer during the programmed burst interval and the first programmable delay timer after the programmed burst interval, respectively.

17. The interface of claim 16, wherein the controller counts the interframe spacing using the first programmable delay timer in response to a determined absence of transmit data.

18. The interface of claim 16, further comprising a transmit buffer for storing the data packets to be transmitted, the controller setting the first programmable delay timer to count the programmed delay interval in response to a determined absence of transmit data in the transmit buffer during the programmed burst interval.

19. The interface of claim 16, further comprising a register storing the programmed burst interval relative to a minimal burst interval and an assigned bandwidth for the network interface.

* * * * *